United States Patent
Chen

(10) Patent No.: US 6,860,600 B2
(45) Date of Patent: Mar. 1, 2005

(54) EDGE COATED OPHTHALMIC LENSES

(75) Inventor: Fang Chen, Hallett Cove (AU)

(73) Assignee: Sola International Holdings, Ltd., Lonsdale (AU)

(*) Notice: Subject to any disclaimer, the term of this patent is extended or adjusted under 35 U.S.C. 154(b) by 0 days.

(21) Appl. No.: 10/381,699

(22) PCT Filed: Sep. 28, 2001

(86) PCT No.: PCT/AU01/01218

§ 371 (c)(1),
(2), (4) Date: Mar. 27, 2003

(87) PCT Pub. No.: WO02/27359

PCT Pub. Date: Apr. 4, 2002

(65) Prior Publication Data

US 2004/0096576 A1 May 20, 2004

(30) Foreign Application Priority Data

Sep. 29, 2000 (AU) .............................. PR 0563

(51) Int. Cl.$^7$ ................................................ G02B 1/10
(52) U.S. Cl. ..................... 351/174; 351/177; 522/41; 522/42; 522/39; 522/37; 522/43; 522/64; 522/96; 522/173; 522/79; 522/80; 522/74; 522/77; 427/2.24; 427/508; 427/514; 427/515

(58) Field of Search ................... 351/174, 177; 427/2.24, 508, 514, 515; 522/37, 39, 41, 42, 43, 64, 96, 173, 74, 77, 79, 80

(56) References Cited

U.S. PATENT DOCUMENTS

| 4,544,572 A | * | 10/1985 | Sandvig et al. | ............. 427/492 |
| 4,814,207 A | | 3/1989 | Siol et al. | |
| 4,879,318 A | * | 11/1989 | Lipscomb et al. | ............ 522/42 |
| 5,246,728 A | * | 9/1993 | Rodriquez | .................. 427/164 |
| 6,514,574 B1 | * | 2/2003 | Valeri et al. | ................ 427/515 |

FOREIGN PATENT DOCUMENTS

| EP | 0 314 979 | 12/1992 |
| WO | WO 92/17535 | 10/1992 |
| WO | WO 96/23243 | 8/1996 |

* cited by examiner

*Primary Examiner*—Susan Berman
(74) *Attorney, Agent, or Firm*—Burns, Doane, Swecker & Mathis, L.L.P.

(57) ABSTRACT

The disclosure relates to the provision of a lens having front and back optical surfaces bound by a peripheral edge, wherein the peripheral edge is coated with an edge coating that strongly bonds to the edge but that only weakly bonds to the optical surface, and wherein the edge coating is durable. A method of coating and a composition are also disclosed. The composition is preferably selected from a limited group of UV curable acrylates.

45 Claims, No Drawings

EDGE COATED OPHTHALMIC LENSES

FIELD OF THE INVENTION

The present invention relates to a method of coating the peripheral edge of a lens, such as a lens for use in eyewear or in optical devices such as microscopes. The method is particularly useful for the coating of the peripheral edges of plastic ophthalmic lenses for use in eyewear, whether they be unpowered lenses (such as often used in sunglasses and protective eyewear) or prescription plus or minus lenses (such as those for use in spectacles).

BACKGROUND OF THE INVENTION

Lenses are used for a variety of purposes, for example in eyewear (such as spectacles and sunglasses) and in optical devices such as microscopes, cameras and telescopes. The use of plastic materials to prepare ophthalmic lenses for use in vision corrective and prescription (Rx) spectacle lenses, as opposed to traditional glass lenses, has increased dramatically due to various advantages of plastic lenses over glass lenses. Amongst other things, such plastic lenses can be made scratch and abrasion resistant and can be provided in a wide range of fashionable colours.

The use of polycarbonate as the plastic material has recently become attractive, compared to the commonly used polymers based on allyl diglycol carbonate monomers (such as CR-39™ available from PPG Industries Inc). Indeed, due to the advantageous properties of polycarbonate, the adoption of polycarbonate as a lens material has seen the development of different lens shapes and configurations, such as the steeply curved lenses described in international patent application PCT/AU99/00430. It has also seen the continuation of interest in rimless spectacle frames, rimless spectacle frames being far more practical for plastic lenses than for glass lenses.

However, such developments have resulted in the peripheral edge of lenses (being the edge bound by the front and back optical surfaces of a lens) sometimes being thicker than normal and also being more visible when in use in eyewear. Indeed, in rimless spectacles, not only will the edge be visible (thus requiring the consideration of aesthetic issues such as colouring the edge for fashion purposes), it will also be subject to the same likelihood of scratching or chipping as would one of the optical surfaces of the lens.

In U.S. Pat. No. 4,076,863 an edge coating process is described wherein a resin material is applied to an edge of a lens and subsequently polymerised. Similarly, U.S. Pat. No. 5,220,358 describes a process whereby an edge of a lens is coated with a dimethyl silicone coblocked with cross-linked vinyl. In each of these cases the coating material needs to be applied carefully to the edge of the lens in order to minimise over-run of the material onto optical surfaces of the lens. This is a time consuming process.

Accordingly, there is a need for a method of coating the edge of a lens (for instance, so as to protect or colour the edge) that overcomes problems with known methods, and it is an aim of the present invention to provide such a method.

SUMMARY OF THE INVENTION

The present invention provides a method of edge coating a lens, such as an ophthalmic lens, the lens having front and back optical surfaces bound by a peripheral edge, the method including the steps of:
  selecting an edge coating material that will strongly bond to the edge, but that will only weakly bond to the optical surfaces;
  applying the edge coating material to the edge; and
  removing any excess edge coating material remaining on the optical surfaces to produce a durable edge coating.
In a preferred form, the edge coating material will be a UV curable edge coating material and the method will additionally include the step of curing the edge coating material after applying it to the lens edge.

The present invention also provides an edge coated lens having front and back optical surfaces bound by a peripheral edge, wherein the peripheral edge is coated with a material that strongly bonds to the edge but that only weakly bonds to the optical surfaces, and wherein the edge coating is durable.

The selection of the edge coating material is thus preferably such as to make the coating method self-masking insofar as the undesirable application of edge coating material to the optical surfaces is concerned. By way of explanation, in one form of the invention, both optical surfaces of a finished ophthalmic lens may have an external coating that is either an abrasion resistant hard coat or an anti-reflection coat, applied to the optical surfaces with sharp definition about the intersection of the optical surfaces with the edge of the lens. However, the edge of the lens will itself be uncoated and will thus be bare lens substrate.

In this form of the invention, by selecting a suitable edge coating material (as will be explained below) that bonds strongly to the bare lens substrate but only weakly (or not at all) to the coated optical surfaces of the lens, the edge coating material may be generously applied to the edge of the lens without having to take particular care about the material accidentally being applied to an optical surface. Any edge coating material that is applied to the optical surfaces may thus simply be wiped off (or otherwise readily and easily removed) as though the optical surfaces were masked prior to the application of the edge coating material, leaving a sharp definition about the intersection of the optical surfaces with the lens edge.

The lenses may be formed from any suitable substrate such as glass or plastic, although plastic substrates are preferred for this invention. In this respect, the plastic substrate may for instance be polymers based on allyl diglycol carbonate monomers (such as CR-39™ available from PPG Industries Inc and SPECTRALITE™ and FINALITE™ available from the applicant) or may be polycarbonate (such as LEXAN™ available from General Electric Co). Polycarbonate materials are the preferred substrates for use with the method of the present invention.

As mentioned above, the present invention relates primarily to the edge coating of plastic ophthalmic lenses, such as polycarbonate ophthalmic lenses, and the following description will generally only provide a detailed discussion of that embodiment. However, it is to be understood that the invention is not to be so limited.

The ophthalmic lenses may be unpowered (piano) for use in, for instance, sunglasses, safety glasses, protective glasses, or sporting glasses, or they may be prescription (Rx) corrective lenses, again for use in a wide variety of glasses. The ophthalmic lenses may be configured to have a traditional curvature, or may be steeply curved such as the lenses described in international patent application PCT/AU99/00403. Indeed, it is envisaged that the method of the present invention will find particular use with these steeply curved lenses due to them typically presenting a thicker peripheral edge as a result of their steeply curved optical surfaces, and also due to them, in use, often being placed in rimless frames.

Preferably, the ophthalmic lenses being edge coated are finished ophthalmic lenses that already have external coatings on each of the front and back optical surfaces. Indeed, the external coatings of the optical surfaces will preferably be of a different chemical nature to the surface of the lens edge, resulting in the optical surfaces having a different propensity to adhere to the edge coating material than the propensity of the lens edge to adhere to the edge coating material. The external coatings of the optical surfaces will thus present a surface to which the selected edge coating material either will not bond at all or will only weakly bond, whereas the bare edge of the lens presents a surface to which the same selected edge coating material will strongly bond.

The external coating will preferably be such as an organosiloxane based hard coating, a UV free radical cured acrylate hard coating, a UV cationically cured epoxide hard coating, a plasma polymerised hard coating, or a multiplayer metal oxide anti-reflection coating. In a preferred form, the external coating of the optical surfaces is thus either a hard coat or an anti-reflection coat such as would be provided by the spin-coating or dip-coating of an organosiloxane hard coating or a UV curable hard coating, the plasma polymerisation of a hard coat, or the vacuum deposition of a multiplayer metal oxide anti-reflection coating.

The bare edge of the lens will, by contrast, thus preferably be raw plastics lens material which is untreated and uncoated. Such a bare edge, being a raw organic polymeric material, is highly susceptible to strong adhesion with an organic polymeric coating.

The selection of a suitable edge coating material will thus be substantially dependent upon the physical properties of the optical surfaces and of the edge of the lens, with the qualifying condition being that the material must strongly bond to the edge but only weakly bond to the optical surfaces. Reference to a coating material that will 'strongly bond' to the lens edge is reference to a coating material that, when coated to the edge of a lens, will pass the primary adhesion test as stipulated by ASTM D3359-93 or its equivalent. Reference to a coating material that will 'weakly bond' to an optical surface is reference to a coating material that, when coated on an optical surface, will be easily removable by a mechanism such as wiping the optical surface with a solvent impregnated cloth or manual removal using the tape test of ASTM D3359-93 referred to above.

In a particularly advantageous form of the present invention, the edge coating material will be selected such that it will not bond at all to the optical surfaces, and indeed may not even wet the optical surfaces. In this form, it is envisaged that the effects of surface tension and wettability will result in there being no retention of edge coating material on the optical surfaces, but rather any excess edge coating material that contacts an optical surface will retreat to the edge of the lens to only coat the edge. Alternatively, the edge coating material may be such as to spread easily onto an optical surface so as to facilitate its removal by the manual tape test referred to above.

Suitable edge coating materials will be materials that provide the desired contrast in bonding, and the self-masking coating effect, that has been described above. Suitable edge coating materials will generally be monomers that can provide a durable edge coating that is not soft, flexible or brittle. In this respect, reference to an edge coating being 'durable' is reference to the coating being both mechanically and chemically durable, such as being abrasion resistant and impact (chipping and cracking) resistant, and being colourfast, solvent resistant, and capable of surviving a standard 3 hour boil test, and/or a weathering test.

In particular, monomers that are ultraviolet radiation curable are preferred for use in the method of the present invention because the preferred type of external coatings (such as anti-reflection coatings) on the optical surfaces of the lens generally should not be subjected to heating over about 80° C. Thus, thermally curable monomers, for instance those that may require curing at temperatures in the range of 100° C. to 200° C., may not be suitable for use with some embodiments of the method of this invention.

The edge coating material will preferably be selected from the group comprising UV curable acrylates, such as lauryl acrylate, isobornyl acrylate, 1,6 hexanediol diacrylate, polyethylene glycol diacrylate, bisphenol A diacrylate, trimethylolpropane triacrylate, tris(2-hydroxy ethyl) isocyanurate triacrylate (SR368), pentaerythritol triacrylate, pentaerythritol tetraacrylate, di-trimethylolpropane tetraacrylate, dipentaerythritol pentaacrylate and aliphatic urethane acrylate. Particularly preferred are the multifunctional acrylates such as tris(2-hydroxy ethyl) isocyanurate, di-trimethylol propane tetraacrylate and urethane acrylate. Some mixtures of urethane acrylate and acrylic esters are also preferred, for example CN945 A60, CN970 A60, CN968 from Sartomer or Ebecryl254, Ebecryl5129, Ebecryl1264 from UCB Chemicals.

Where the edge coating material is a UV curable material, it will preferably include a UV initiator selected from the group including α-hydroxy-ketones, α-amino-ketones, benzildimethyl-ketal, phosphine oxide (such as 2,4,6-trimethyl-benzoyldiphenylphosphine oxide or bis(2,4,6-trimethylbenzoyl)-phenyl-phosphine oxide).

In a preferred form of the present invention, the edge coating material will include levelling agents. Such levelling agents assist in achieving a uniform coating of the edge coating material on the lens edge by assisting in reducing the surface tension. Such levelling agents may be selected from the group comprising fluorinated surfactants and polydimethyl siloxane based surfactants.

Optionally, the edge coating material will include release agents. Such release agents assist in achieving a weak bond to optical surfaces without affecting the strong bond adhesion to the lens edge. Suitable release agents may be selected from poly-dimethyl siloxane, silicon grease, paraffin oil or wax.

In a particularly preferred form of the present invention, the method will be used to apply a coloured edge coating to a plastic ophthalmic lens. In this form, the edge coating material will thus include a dye or a pigment, preferably evenly dispersed or dissolved throughout. The dye or pigment may be any suitable dye or pigment such as 1:2 cobalt and chrome complexes, anthraquinones and metal-free azo dyes, or combinations thereof. The colour may be chosen from standard, pastel or vivid colours, metallised colours, pearled colours, fluorescent colours, iridescent colours or phosphorescent colours, and may be photochromic. The coloured edge coating may then have a matt, satin or glossy finish, and may be opaque or translucent.

The application of such a coloured edge coating on an ophthalmic lens is becoming quite fashionable for lenses used in rimless spectacle frames. However, to date, there has been no acceptable commercial technique available for easily and accurately applying a durable, attractive coloured edge coat. Indeed, the only commercially available system known to the applicant is the manual application of ink by a pen. The preferred form of the method of the present invention thus provides a greatly improved technique for achieving a durable, coloured edge on an ophthalmic lens.

The edge coating material may also include one or more suitable solvents in order to assist in various formulating aspects of the material. For instance, where the edge coating material includes a pigment or a dye, a solvent will help disperse the pigment or dye throughout the material. Additionally, the presence of a solvent can assist in adjusting the viscosity of the edge coating material for use in different application techniques (as will be described below). For instance, a lower viscosity edge coating solution is required for an application technique based on spraying than one based on brushing. Furthermore, the presence of a solvent may assist in promoting bonding of the edge coating material to the edge of the lens.

The selection of a suitable solvent preferably takes into account the effect that individual solvents may have on the lens substrate, particularly where the edge coating material is being applied directly to bare substrate. For instance, some solvents will craze polycarbonate and thus should be avoided. Also, some solvents may slightly dissolve polycarbonates and thus may be useful in ensuring strong bonding and good durability.

Suitable solvents for use in the edge coating material may be selected from the group including toluene, xylene, ethanol, isopropanol, iso-butanol, methyl ethyl ketone, methyl isobutyl ketone, ethyl acetate, isopropyl acetate, propyleneglycol monomethylether, and mixtures thereof.

The edge coating material may be applied to the edge of a plastic lens by any suitable technique, such as by brushing or spraying methods. For example, the coating material may be brushed onto the lens edge with a brush or a cotton bud or the like. Alternatively, the edge coating material may be provided in the form of a solution to be sprayed through a nozzle with compressed air or the like. The coating can also be applied to the edge without a colour to achieve a uniform colourless glossy, matt or satin finish as required.

It will thus be appreciated that the method of the present invention eliminates the need for an edge polishing step in the manufacture of lenses, a step traditionally required in the manufacturing process to provide cosmetically acceptable lens edges. It will also serve to provide a lens with an acceptable edge seal to prevent, for instance, the ingression of moisture via an otherwise moisture susceptible region of a lens and also to protect the edge against chemical attack (such as from solvents or grease). Further still, the method provides an ability to provide a lens with a durable, coloured edge coating such that a fashionable range of lenses may be provided for use in, for instance, rimless spectacle frames.

The present invention also provides a composition including an edge coating material as described herein.

DETAILED DESCRIPTION OF PREFERRED EMBODIMENTS

The present invention will now be described in relation to various examples that provide preferred embodiments. However, it is to be appreciated that the following description is not to limit the generality of the above description. In particular, it will be noted that all of the following examples show an edge coating material that contains a dye or pigment for colouring purposes, but the invention is not to be so limited.

EXAMPLE 1

The following formulation was sprayed on the edge of an edged ophthalmic lens having an organosiloxane hard coat and a multilayer inorganic oxides AR coat on its optical surfaces, and was subsequently cured with a UV lamp for 20 seconds with a UV dosage of 1.0 J/cm$^2$. The cured excess material on the optical surfaces of the lens was removed by the use of sticky tape with a subsequent wipe with ethanol, and the resulting edge coating was solvent (acetone) resistant and durable.

| Components | Percentage (wt %) |
| --- | --- |
| Aliphatic urethane acrylate | 30.7 |
| UV initiator (Irgacure ™ 184 from Ciba Geigy) | 1.5 |
| Levelling agent | 0.1 |
| Solvent | 67.6 |
| Dye | 0.1 |

EXAMPLE 2

A colour pigment was predispersed in the following formulation to provide a colour concentrate for the further formulation work of Examples 3 to 5 and Comparative Examples 1 and 2.

Different colours of concentrate could of course be prepared by using different colour pigments in the following formulation. For instance, a yellow concentrate can be achieved by using Ciba Geigy Microlith Yellow MX-A pigment in the above formulation, a red concentrate by using Ciba Geigy Microlith Scarlet R-A pigment, and a blue concentrate by using Ciba Geigy Microlith Blue 4G-A, etc.

The colour concentrate formulation used in the edge coating material exemplified below in this Example, and also in Examples 3 to 5 and Comparative Examples 1 and 2, was as follows:

| Components | Percentage (wt %) |
| --- | --- |
| Microlith A pigment (Ciba Geigy) | 15 |
| Nitrocellulose/18% dibutyl phthalate | 2 |
| Acrylic resin (JONCRYL 67) | 3 |
| Propyleneglycol monomethylether | 5 |
| Ethylacetate | 20 |
| Ethanol | 55 |

Using this colour concentrate, a further formulation was prepared in accordance with the table below, and was sprayed on the edge of an edged ophthalmic lens having an organosiloxane hard coat and a multilayer inorganic oxides AR coat on its optical surfaces, and was subsequently cured with a UV lamp for 20 seconds at a UV dosage of about 1.0 J/cm$^2$. The cured excess edge coating material on the optical surfaces was removed with sticky tape and with a subsequent wipe with ethanol, and the resulting edge coating was durable and solvent (acetone) and UV resistant.

| Components | Percentage (wt %) |
| --- | --- |
| Aliphatic urethane acrylate | 28.0 |
| UV initiator (Irgacure ™ 184 from Ciba Geigy) | 1.4 |
| Levelling agent | 0.1 |
| Solvent | 61.7 |
| Colour concentrate (as per above description) | 8.8 |

EXAMPLE 3

The following formulation was brushed with a cotton bud onto the edge of an edged ophthalmic lens having an organosiloxane hard coat and a multilayer inorganic oxides AR coat on its optical surfaces, and was subsequently cured with a UV lamp for 20 seconds with a UV dosage of about 1.0 J/cm². The cured excess edge coating material on the optical surfaces of the lens was removed with sticky tape, the lens then being wiped with ethanol, and the resulting edge coating was found to be durable and solvent and UV resistant.

| Components | Percentage (wt %) |
|---|---|
| Aliphatic urethane acrylate | 48.9 |
| UV initiator (Irgacure ™ 184 from Ciba Geigy) | 2.3 |
| Levelling agent | 0.2 |
| Solvent | 33.2 |
| Colour concentrate as per Example 2 above | 15.4 |

EXAMPLE 4

The formulation below was sprayed with a compressed air spray gun onto the edge of an edged ophthalmic lens having an organosiloxane hard coat and a multilayer inorganic oxides AR coat on its optical surfaces, and was subsequently cured with a UV lamp for 20 seconds with a UV dosage of about 1.0 J/cm². The excess edge coating material on the optical surfaces of the lens was removed with sticky tape and the lens was subsequently wiped with ethanol, and the resulting edge coating was found to be durable and solvent and UV resistant.

| Components | Percentage (wt %) |
|---|---|
| Tris(2-hydroxy ethyl) isocyanurate triacrylate | 27.9 |
| UV initiator (Irgacure ™ 184 from CIBA) | 1.9 |
| Levelling agent (BYK371 ™ from BYK Chemie) | 0.1 |
| Solvent (methyl ethyl ketone) | 61.3 |
| Colour mother concentrate as per Example 2 above | 8.8 |

EXAMPLE 5

The formulation below was sprayed with a compressed air spray gun onto the edge of an edged ophthalmic lens having an organosiloxane hard coat and a multilayer inorganic oxides AR coat on its optical surfaces, and was subsequently cured with a UV lamp for 20 seconds with a UV dosage of about 1.0 J/cm². The excess edge coating material on the optical surfaces of the lens was removed with sticky tape and the lens was subsequently wiped with ethanol, and the resulting edge coating was found to be durable and solvent and UV resistant.

| Components | Percentage |
|---|---|
| Di-trimethylolpropane tetraacrylate | 27.9 |
| UV initiator (Irgacure ™ 184 from CIBA) | 1.9 |
| Levelling agent | 0.1 |
| Solvent | 61.3 |
| Colour concentrate as per Example 2 above | 8.8 |

EXAMPLE 6

The following clear formulation was sprayed on the edge of an edged ophthalmic lens having an organosiloxane hard coat and a multilayer inorganic oxides AR coat on its optical surfaces, and was subsequently cured with a UV lamp for 20 seconds with a UV dosage of 1.0 J/cm². The cured excess material on the optical surfaces of the lens was removed by the use of sticky tape with a subsequent wipe with ethanol, and the resulting edge coating was solvent (acetone) resistant and durable.

| Components | Percentage (wt %) |
|---|---|
| Aliphatic urethane acrylate | 30.7 |
| UV initiator (Irgacure ™ 184 from Ciba Geigy) | 1.5 |
| Levelling agent | 0.1 |
| Solvent | 67.7 |

EXAMPLE 7

The formulation below was sprayed with a compressed air spray gun onto the edge of an edged ophthalmic lenses having an organosiloxane hard coat and a multilayer inorganic oxide AR coat on its optical surfaces, and was subsequently cured with a UV lamp for 20 seconds with a UV dosage of about 1.0 J/cm². The excess edge coating material on the optical surfaces of the lens was removed with sticky tape and the lens was subsequently wiped with ethanol, and the resulting edge coating was found to be durable and solvent and UV resistant. The edge coating provided a metallic finish.

| Components | Percentage (wt %) |
|---|---|
| Mixture of urethane acrylate and acrylic esters. | 29.6 |
| UV initiator (Irgacure ™ 184) | 1.4 |
| Levelling agent | 0.1 |
| Release agent | 5.9 |
| Solvent | 60.0 |
| Metallic pigment | 3.0 |

COMPARATIVE EXAMPLE 1

The following formulation was sprayed with a compressed air spray gun onto the edge of an edged ophthalmic lens having an organosiloxane hard coat and a multilayer inorganic oxides AR coat on its optical surfaces. The coloured edge coating was dried after solvents were evaporated. The resulting edge coating was poor in wear resistance and the colour could be easily wiped off by acetone. This indicated that the edge coating material was not suitable for providing an acceptably durable coating on the raw edge of the ophthalmic lens.

| Components | Percentage (wt %) |
|---|---|
| Nitrocellulose/18% dibutyl phthalate | 20.0 |
| Acrylic resin (JONCRYL 67) | 10.0 |
| Levelling agent | 0.1 |
| Solvent | 61.1 |
| Colour concentrate as per Example 2 above | 8.8 |

COMPARATIVE EXAMPLE 2

The following formulation was brushed with a cotton bud onto the edge of an edged ophthalmic lens having an organosiloxane hard coat and a multilayer inorganic oxides AR coat on its optical surfaces, and was subsequently cured with a UV lamp for 20 seconds with a UV dosage of about 1.0 J/cm². The cured excess edge coating material on the optical surfaces of the lens was removed with sticky tape, the lens then being wiped with ethanol, and the resulting edge coating was found to be solvent and UV resistant but not wear resistant, indicating that the monomer selected was not suitable for providing a durable edge coating.

| Components | Percentage (wt %) |
|---|---|
| Isobornyl acrylate | 48.9 |
| UV initiator (Irgacure ™ 184 from Ciba Geigy) | 2.3 |
| Levelling agent | 0.2 |
| Solvent | 33.2 |
| Colour concentrate as per Example 2 above | 15.4 |

Finally, it will be appreciated that there may be other modifications and alterations made to the configurations described herein that are also within the scope of the present invention.

What is claimed is:

1. A method of edge coating a lens having front and back optical surfaces bound by a peripheral edge, the method including the steps of: selecting an edge coating material that will strongly bond to the edge, but that will only weakly bond to the optical surfaces; applying the edge coating material to the edge; and removing any excess edge coating material remaining on the optical surfaces to produce a durable edge coating.

2. A method as in claim 1 wherein the lens is a finished lens that is externally coated on each of the front and back optical surfaces.

3. A method as in claim 2 wherein the lens is plastic.

4. A method as in claim 3 wherein the plastic is selected from the group including a polymer based on allyl diglycol carbonate or polycarbonate.

5. A method as in claim 4 wherein the edge coating material is curable to form an organic polymer and the method includes the step of curing the edge coating material after applying it to the lens edge.

6. A method as in claim 5 wherein the edge coating material is ultraviolet radiation curable.

7. A method as in claim 6 wherein the edge coating material is a monomer that, after curing, provides a durable edge coating that is not soft, flexible or brittle.

8. A method as in claim 7 wherein the edge coating material is an acrylate.

9. A method as in claim 8 wherein the acrylate is selected from the list of lauryl acrylate; isobornyl acrylate; 1,6-hexanediol diacrylate; polyethylene glycol diacrylate; bisphenol A diacrylate; trimethylpropane triacrylate; tris (2-hydroxyethyl) isocyanurate triacrylate; pentaerythritol triacrylate; pentaerythritol tetraacrylate; di-trimethylolpropane tetraacrylate; dipentaerythritol pentaccrylate; urethane acrylate; and mixtures of urethane acrylates and acrylic esters.

10. A method as in claim 9 wherein the acrylate is a multifunctional acrylate selected from the group of tris (2-hydroxyethyl) isocyanurate triacrylate; di-trimethylolpropane tetraacrylate; urethane acrylates; and mixtures of urethane acrylates and acrylic esters.

11. A method as in claim 9 wherein the edge coating material includes a ultraviolet initiator.

12. A method as in claim 11 wherein the ultraviolet initiator is selected from the group of; α-hydroxy-ketones; α-amino-ketones; benzil dimethyl-ketal; and phosphine oxide.

13. A method as in claim 11 wherein the edge coating includes a levelling agent to assist in achieving a uniform coating of the edge coating material on the lens edge.

14. A method as in claim 9 wherein the edge coating includes a levelling agent to assist in achieving a uniform coating of the edge coating material on the lens edge.

15. A method as in claim 14 wherein the levelling agent is a surfactant selected from the group of fluorinated surfactants and polydimethyl siloxane based surfactants.

16. A method as in claim 15 wherein the edge coating material includes a release agent.

17. A method as in claim 15 wherein the edge coating material includes a solvent.

18. A method as in claim 16 wherein the release agent is selected from the group of poly-dimethyl siloxane; silicon grease; paraffin oil; and wax.

19. A method as in claim 15 wherein the edge coating material includes a solvent.

20. A method as in claim 9 wherein the lens is an ophthalmic lens.

21. A method as in claim 19 wherein the method is used to apply a coloured edge coating and the edge coating material includes a dye or pigment.

22. A method as in claim 1 wherein the lens is an ophthalmic lens.

23. A lens having front and back optical surfaces bound by a peripheral edge, wherein the peripheral edge is coated with an edge coating that strongly bonds to the edge but that only weakly bonds to the optical surfaces, and wherein the edge coating is durable.

24. A lens as in claim 23 wherein the lens is an ophthalmic lens.

25. A lens as in claim 24 wherein the lens is plastic.

26. A lens as in claim 25 wherein the lens is externally coated on each of the front and back optical surface.

27. A lens as in claim 23 wherein the edge coating material is curable to form an organic polymer.

28. A lens as in claim 23 wherein the edge coating material is an ultraviolet curable monomer.

29. A lens as in claim 28 wherein the monomer is an acrylate.

30. A lens as in claim 29 wherein the acrylate is selected from the group of; lauryl acrylate; isobornyl acrylate; 1,6-hexanediol diacrylate; polyethylene glycol diacrylate; bisphenol A diacrylate; trimethylpropane triacrylate; tris (2-hydroxyethyl) isocyanurate triacrylate; pentaerythritol triacrylate; pentaerythritol tetraacrylate; di-trimethylolpropane tetraacrylate; dipentaerythritol pentaccrylate; urethane acrylate; and mixtures of urethane acrylates and acrylic esters.

31. A lens as in claim 30 wherein the acrylate is a multifunctional acrylate selected from the group of tris (2-hydroxyethyl) isocyanurate triacrylate; di-trimethylolpropane tetraacrylate; urethane acrylate; and mixtures of urethane acrylates and acrylic esters.

32. A lens as in claim 31 wherein the edge coating material coloured.

33. A composition including an edge coating material that strongly bonds to an edge of a lens, but only weakly bonds to front and back optical surfaces of the lens that are bound by the edge, wherein the composition includes a release agent and is suitable for application to the edge such that any excess edge coating material on the optical surfaces can be removed to produce a durable edge coating.

34. A composition as in claim 33 wherein the edge coating material is curable to form an organic polymer.

35. A composition as in claim 33 wherein the edge coating material is an acrylate.

36. A composition as in claim 35 wherein the acrylate is selected from the group of: lauryl acrylate; isobornyl acrylate; 1,6-hexanediol diacrylate; polyethylene glycol diacrylate; bisphenol A diacrylate; trimethylpropane triacrylate; tris (2-hydroxyethyl) isocyanurate triacrylate; pentaerythritol triacrylate; pentaerythritol tetraacrylate; di-trimethylolpropane tetraacrylate; dipentaerythritol pentaccrylate; urethane acrylate; and mixtures of urethane acrylates and acrylic esters.

37. A composition as in claim 36 wherein the acrylate is a multifunctional acrylate selected from the group of tris (2-hydroxyethyl) isocyanurate triacrylate; di-trimethylolpropane tetraacrylate; urethane acrylate; and mixtures of urethane acrylates and acrylic esters.

38. A composition as in claim 37 wherein the composition includes a ultraviolet initiator.

39. A composition as in claim 38 wherein the ultraviolet initiator is selected from the group of: α-hydroxy-ketones; α-amino-ketones; benzil dimethyl-ketal; and phosphine oxide.

40. A composition as in claim 39 wherein the composition includes a levelling agent.

41. A composition as in claim 40 wherein the levelling agent is a surfactant selected from the group of fluorinated surfactants and polydimethyl siloxane based surfactants.

42. A composition as in claim 33 wherein the release agent is selected from the group of poly-dimethyl siloxane; silicon grease; paraffin oil; and wax.

43. A composition as in claim 33 wherein the composition includes a solvent.

44. A composition as is claim 43 wherein the solvent is selected from one or more of the group of toluene, xylene, ethanol, isopropanol, iso-butanol, methyl ethyl ketone, methyl isobutyl ketone, ethyl acetate, isopropyl acetate, and propyleneglycol monomethylether.

45. A composition as in claim 33 wherein the composition includes a dye and/or a pigment.

* * * * *